June 1, 1948.  C. STACK  2,442,714
AXIALLY SHIFTING TYPE ADJUSTABLE TIRE STRIPPING APPARATUS
Filed March 7, 1945  2 Sheets-Sheet 1

INVENTOR
Carl Stack
BY
ATTORNEY

June 1, 1948. C. STACK 2,442,714
AXIALLY SHIFTING TYPE ADJUSTABLE TIRE STRIPPING APPARATUS
Filed March 7, 1945 2 Sheets-Sheet 2

INVENTOR
Carl Stack
BY John E. Jackson
ATTORNEY

Patented June 1, 1948

2,442,714

UNITED STATES PATENT OFFICE 2,442,714

AXIALLY SHIFTING TYPE ADJUSTABLE TIRE STRIPPING APPARATUS

Carl Stack, Gary, Ind.

Application March 7, 1945, Serial No. 581,497

2 Claims. (Cl. 157—6)

This invention relates to a tire stripping apparatus and more particularly to such apparatus for removing tire casings from rims. A common method of removing tire casings from rims is by means of hand tools which are used to progressively pry the beads loose around the rim. In removing tires which have not been on the rim too long (less than six months), this method is fairly satisfactory since the tire can be removed by one man in less than an hour. However, when the tire has been on for a longer period of time, there is a tendency for the rim to rust and the tire to freeze tight. This tendency is more pronounced the longer the tire remains on the rim and in some cases it is almost impossible to remove the tire without damaging it. In practically all cases the pounding and prying with the hand tools is dangerous and the chances are that the tire will be more or less damaged during its removal.

Replacing tires on the rims is not as difficult as removing them since the rim can be cleaned and soaped so that the tire slides on easily. However, springing the lock ring into position is troublesome and dangerous. The present method of replacing tires by hand does not provide any way of accurately positioning the lock ring which makes it especially difficult to spring it into place.

Various types of apparatus have also been suggested for removing tires from their rims, but they all possess certain disadvantages. Some can only be used for one size of tire, or if used for different sizes, no means are provided for centering the tire on the stripper, this making it difficult to remove the tire without damaging it. The type of pressing foot in general use is such that it may cut or otherwise damage the tire.

It is an object of my invention to provide apparatus for positively removing the tire from its rim without damaging it.

Another object is to provide such apparatus which can also be used to replace the tire on the rim.

These and other objects will be more apparent after referring to the following specifications and attached drawings, in which.

Figure 1:
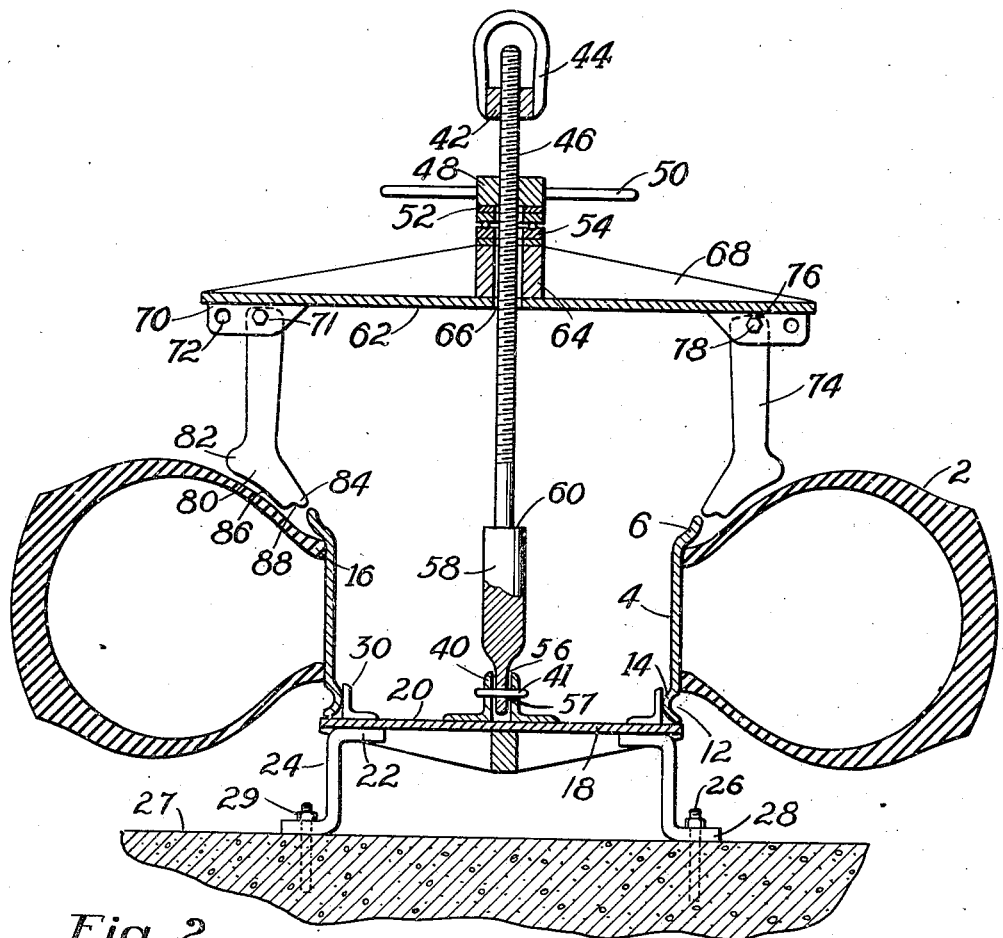
Figure 1 is a vertical section through the center of the tire stripper showing a tire in place ready for stripping.
Figure 2:
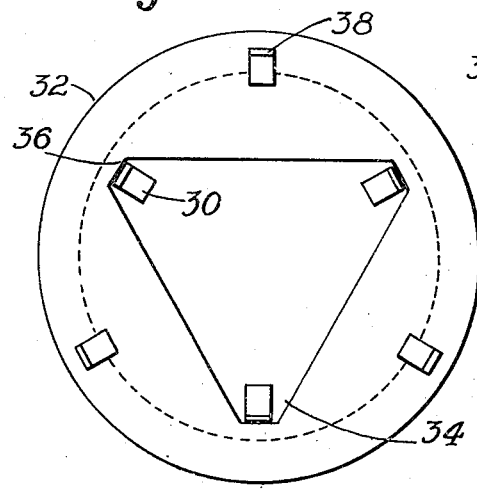
Figure 2 is a top plan view of the tire supporting table with a table extension in place.
Figure 3:
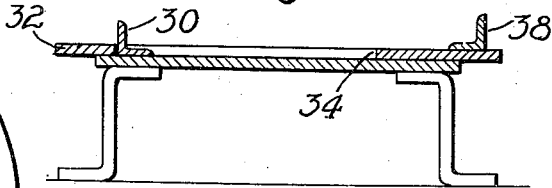
Figure 3 is a sectional view of the table of Figure 2 through the centering lugs.
Figure 4:
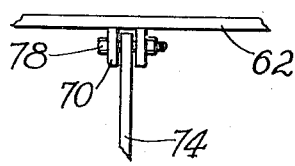
Figure 4 is a fragmentary view showing the pressing leg support.

Referring more particularly to the drawings, reference numeral 2 indicates a tire casing which is mounted on a rim 4 having a flange 6 on its inner end, this being at the top in Figure 1. The tire 2 is held on the rim 4 by means of a removable flange 8 which is locked in place by a lock ring 10, this being sprung into an opening 12 in the bead 14 on the outer end of the rim 4. Ordinarily the bead 16 of the tire sticks to the rim 4 and therefore my apparatus has been arranged to apply the pressure to the bead of the tire casing as close as possible to the point where it fits on the rim. The tire to be stripped is supported on a table 18 which consists of a plate 20 welded or otherwise fastened to the upper flanges 22 of each of the table legs 24, which are spaced around the periphery of plate 20 as desired. Bolts 26 are embedded in the floor 27 and pass through holes in the lower flanges 28 of the legs 24. Nuts 29, screwed on the bolts 26, fasten the table 18 to the floor. The plate 20 is of circular form and is provided with centering lugs 30 arranged around its periphery and positioned from the center of the plate 20 a distance sufficient to center the smallest size tire which is to be stripped. In order that a plurality of different sizes of tires may be stripped while using the same machine, there is provided a table extension 32 for each different size of tire. Each table extension 32 has an opening 34 in the center thereof of substantially triangular shape with its apices truncated at 36 to closely fit the centering lugs 30 to hold it in centered position on the table 18. Welded or otherwise fastened to the top of the table extension are three centering lugs 38 which are similar to lugs 30. The outer diameter of the table extension 32 and the distance of lugs 38 from the table center varies in accordance with the size of the tire which is to be supported on the table extension. Fastened to the top of plate 20 at the center thereof are a pair of spaced apart lugs 40 having opposed openings therein for receiving a pin 41. Above the table 18 is a nut 42 fastened to a lifting shackle 44 which is supported in any suitable manner, such as from a crane hook. A bolt 46 is threaded into the nut 42 and carries a second nut 48 having handles 50 thereon. Below the nut 48 on the bolt 46 is a washer 52 below which is a thrust ball bearing 54. The lower part of the bolt 46 has a flat head 56 with an opening 57 therein, above which is an unthreaded portion 58 of greater diameter than the threaded portion. A shoulder 60 at the upper end of the portion 58 supports a head plate 62 prior to assembly of the plate 62 and table 18. A hub 64 having an opening 66 of slightly greater diameter than the threaded portion of the bolt 46 is welded or otherwise fastened to the plate 62. Ribs 68 are welded to the plate 62 and hub 64 for reinforcing. Beneath the plate 62 are twelve equally spaced pairs of lugs 70 having a plurality of holes therein arranged at different distances from the center of the plate to enable different size tires to be stripped from their rims. Two holes 71 and 72 are shown, but the number may be varied as desired. A pressing leg 74, having a hole 76 at its upper end, is attached to each of the lugs 70 by means of a bolt 78 passing through holes 72 and 76. The bottom of each of the legs 74 is provided with a foot 80 having a heel 82, a toe 84, and a concave lower surface 86 which closely conforms to the shape of the tire. The underside of the toe 84 is rounded so that it will not cut into the rubber tire casing and is notched at 88 for a purpose which will appear later.

Figure 5:
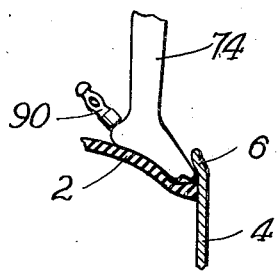
Figure 5 is a fragmentary view showing the position of the stripping foot at the beginning of the stripping operation.

The operation of the device is as follows:

In stripping a tire from its rim the flange 8 and locking ring 10 are first removed after which the wheel is positioned on the table 18 with the bead 14 against the lugs 30, thus centering the tire on the table 18. The pressing legs 74 are then fastened to the holes 71 of the lugs 70 and the head 62 lowered until the feet 80 rest on the side wall of the tire casing 2. The bolt 46 continues to be lowered until the head 56 passes between the lugs 40, after which the pin 41 is passed through the openings in the lugs 40 and opening 57 in bolt 46 to lock the bolt to the table 18. The nut 48 is then screwed down until the feet have depressed the side wall of the casing 2 enough to permit driving of the toes 84 under the flange 6 and against the rim 4 with the hammer 90, as shown in Figure 5. It will be seen that the toe 84 is in the best position to break the bond between the bead 16 and the rim 4. After the bond is broken the nut 48 is screwed downwardly so that the feet 80 move the top bead 16 down the rim 4 until it contacts the bottom bead to break its bond with the rim and then pushes the tire ahead until it drops to the floor.

When removing a tire of larger than the minimum size, a table extension 32 of the desired size is centered in position on the table 18 and the wheel centered thereon by means of the lugs 38. The legs 74 are removed outwardly and supported in the holes 72 which correspond to the size of the tire.

Figure 6:
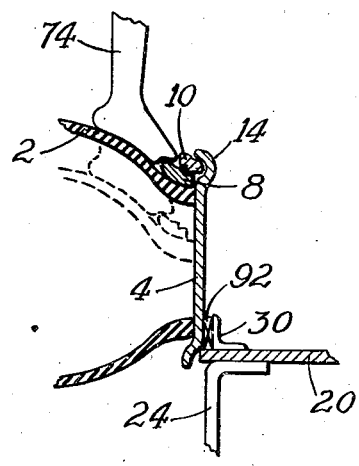
Figure 6 is a fragmentary view showing a tire being replaced on a rim.

When replacing the tire, the rim 4 is set on the table 18 with the flange 6 down and fillers 92 are inserted between the rim 4 and the lugs 30 to center the rim in position. The casing 2 usually slips on easily after which the removable rim 8 is placed in position and the feet 80 lowered until the notches 88 under the toes 84 engage the edge of flange 8. The nut 48 is then screwed down until the casing 2 is forced to the dotted line position in Figure 6. The locking ring 10 can then be sprung into the groove 12 of the bead 14. The tire is inflated to force the bead of the tire up as the nut 48 is unscrewed until the flange 8 rests solidly against the locking ring 10 after which the tire can be inflated to the required pressure. It will be noted in Figure 6 that the depth of the notch 88 is such that there is clearance between the end of the toe and the locking ring 10 when the flange 8 is positioned in the notch 88.

Figure 7:
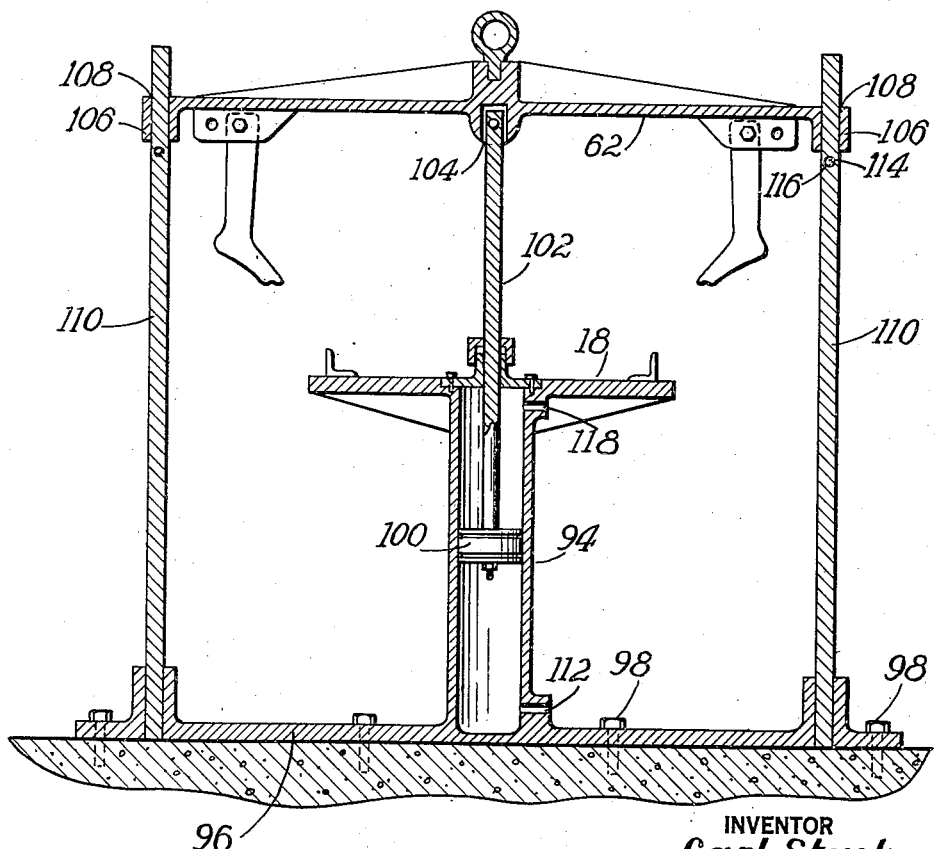
Figure 7 is a vertical section through the center of a second embodiment of my invention.

Figure 7 shows a second embodiment of my invention, in which an air cylinder is used to operate the stripper. In this embodiment, the table 18 is supported on a cylinder 94 instead of on legs 24. The cylinder 94 is attached to a base 96 which is bolted to the floor by means of bolts 98. Within the cylinder 94 is a piston 100 to which is attached a piston rod 102. The head plate 62 is provided with an opening 104 for detachably receiving the piston rod 102. In order to center the head 62, it is provided with extensions 106, each of which has an opening 108 therein for receiving guide rods 110 which are fastened to base 96. Table 18 and head plate 62 are otherwise identical with the arrangement shown in my first embodiment, and the operation is also similar. In operation, air is admitted to the bottom of cylinder 94 through an opening 112 to raise the head 62 to the position shown in Figure 7. Pins 114 are then placed in holes 116 in guide rods 102 to hold the head in the elevated position, the piston rod 102 is uncoupled from the head plate 62 and air is admitted to the top of cylinder 94 through opening 118 to lower the piston rod 102. The tire and rim are then positioned on the table 18, after which the piston rod 102 is recoupled to the plate 62 which is lowered by admitting air to the top of cylinder 94 until the feet 80 rest on the side wall of the casing 2. The stripping operation is then carried out in the same manner as with the first embodiment of my invention.

While two embodiments have been shown and described, it will be apparent that other adaptations and modifications may be made without departing from the scope of the following claims.

I claim:

1. Apparatus for stripping a tire from its rim comprising a rim supporting table, centering lugs on the table extending upwardly therefrom, said centering lugs being spaced inwardly from the periphery of said table, a table extension supported on said table, said table extension having an opening therein, said lugs extending through said opening close to the periphery thereof to center the extension on said table, lugs on said extension extending upwardly therefrom for centering the rim on said extension, a tire stripping member above said table in coaxial relationship therewith, and means for causing relative movement between said table and said member to strip said tire from its rim.

2. Apparatus for stripping a tire from its rim comprising a rim supporting table, three centering lugs on the table extending upwardly therefrom, a table extension supported on said table, said table extension having an opening therein, said opening being substantially triangular in shape, said lugs extending through said triangular opening at the apices thereof to center the extension on said table, lugs on said extension extending upwardly therefrom for centering the rim on said extension, a tire stripping member above said table in coaxial relationship therewith, and means for causing relative movement between said table and said member to strip said tire from its rim.

CARL STACK.

REFERENCES CITED

The following references are of record in the file of this patent:

UNITED STATES PATENTS

| Number | Name | Date |
|---|---|---|
| 1,116,468 | Nelson | Nov. 10, 1914 |
| 1,481,061 | Hunter | Jan. 15, 1924 |
| 1,564,496 | Staugaard | Dec. 8, 1925 |
| 1,615,469 | McKenzie | Jan. 25, 1927 |
| 1,641,083 | Hite | Aug. 30, 1927 |
| 1,667,351 | Levitt | Apr. 24, 1928 |
| 1,742,590 | Freivogel | Jan. 7, 1930 |
| 1,948,434 | Stafford et al. | Feb. 20, 1934 |